US009892192B2

United States Patent
Chandrasekaran et al.

(10) Patent No.: US 9,892,192 B2
(45) Date of Patent: *Feb. 13, 2018

(54) INFORMATION HANDLING SYSTEM AND COMPUTER PROGRAM PRODUCT FOR DYNAMICALLY ASSIGNING QUESTION PRIORITY BASED ON QUESTION EXTRACTION AND DOMAIN DICTIONARY

(71) Applicant: International Business Machines Corporation, Armonk, NY (US)

(72) Inventors: Swaminathan Chandrasekaran, Coppell, TX (US); Kevin B. Haverlock, Cary, NC (US); Nicholas J. Hill, Southampton (GB); Roy D. Mobley, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/502,437

(22) Filed: Sep. 30, 2014

(65) Prior Publication Data

US 2016/0092523 A1   Mar. 31, 2016

(51) Int. Cl.
*G06F 7/00* (2006.01)
*G06F 17/30* (2006.01)
(Continued)

(52) U.S. Cl.
CPC .... *G06F 17/30684* (2013.01); *G06F 17/3053* (2013.01); *G06F 17/30654* (2013.01);
(Continued)

(58) Field of Classification Search
CPC ......... G06F 17/30683; G06F 17/30654; G06F 17/30731; G06F 17/30053; G06F 17/30563; H04L 67/306; H04L 29/08
(Continued)

(56) References Cited

U.S. PATENT DOCUMENTS 7,266,535 B1 * 9/2007 Nelken ................. G06N 5/022
704/E15.045
7,287,041 B2 * 10/2007 Barnes-Leon .... G06F 17/30569
(Continued)

FOREIGN PATENT DOCUMENTS

CN       103544219 A      1/2014

OTHER PUBLICATIONS

Harabagiu et al., "Intentions, Implicatures and Processing of Complex Questions," HLT-NAACL Workshop on Pragmatics of Question Answering, 2004.
(Continued)

*Primary Examiner* — Daniel Kuddus
(74) *Attorney, Agent, or Firm* — Terrile, Cannatti, Chambers & Holland, LLP; Michael Rocco Cannatti

(57) ABSTRACT

An approach is provided dynamically prioritizing question requests based on extracted question data. In the approach, performed by an information handling system, a number of question requests to a question and answering (QA) system are received from a computer network, and a plurality of question priority parameters are identified, including one or more question topics and a plurality question context parameters, by performing natural language processing (NLP) analysis of each question request. The approach determines a target priority value for each question request based on the plurality of question priority parameters identified for said question request. By evaluating the target priority values for the plurality of question requests, processing of the question requests is prioritized by applying an artificial intelligence (AI) learned models and rule-based logic at the information handling system to evaluate the target priority values for the plurality of question requests.

14 Claims, 4 Drawing Sheets

(51) Int. Cl.
*G06N 5/04* (2006.01)
*G06N 99/00* (2010.01)
*H04L 29/08* (2006.01)

(52) U.S. Cl.
CPC ....... *G06F 17/30731* (2013.01); *G06N 5/046* (2013.01); *G06N 99/005* (2013.01); *H04L 67/306* (2013.01)

(58) Field of Classification Search
USPC ................ 707/728, 748, 759, 760, 761, 735
See application file for complete search history.

(56) References Cited

U.S. PATENT DOCUMENTS

| | | | |
|---|---|---|---|
| 7,409,335 B1 | 8/2008 | Horvitz et al. | |
| 7,454,393 B2* | 11/2008 | Horvitz | G06F 17/30684 706/46 |
| 7,725,334 B2 | 5/2010 | Wahlbin et al. | |
| 7,949,589 B2* | 5/2011 | Halpin | G06Q 40/00 705/36 R |
| 7,958,066 B2 | 6/2011 | Pinckney et al. | |
| 8,281,374 B2* | 10/2012 | Carter | H04L 63/0807 713/156 |
| 8,285,636 B2* | 10/2012 | Curry | G06Q 40/025 705/38 |
| 8,593,274 B2 | 11/2013 | Gancarcik et al. | |
| 8,627,221 B2 | 1/2014 | Plummer et al. | |
| 8,983,996 B2* | 3/2015 | Lai | G06F 17/30867 707/767 |
| 9,336,285 B2* | 5/2016 | Vidra | G06F 17/30554 |
| 2002/0016070 A1* | 2/2002 | Friese | H01L 22/32 438/689 |
| 2003/0009385 A1 | 1/2003 | Tucciarone et al. | |
| 2003/0101153 A1 | 5/2003 | Francis et al. | |
| 2003/0177032 A1* | 9/2003 | Bonissone | G06F 17/243 705/2 |
| 2004/0122846 A1 | 6/2004 | Chess et al. | |
| 2004/0199489 A1* | 10/2004 | Barnes-Leon | G06F 17/30569 |
| 2006/0010217 A1* | 1/2006 | Sood | H04L 51/12 709/206 |
| 2007/0016563 A1 | 1/2007 | Omoigui | |
| 2007/0067293 A1 | 3/2007 | Yu | |
| 2007/0124263 A1 | 5/2007 | Katariya et al. | |
| 2007/0203863 A1 | 8/2007 | Gupta et al. | |
| 2008/0010058 A1 | 1/2008 | Weng et al. | |
| 2008/0276159 A1 | 11/2008 | Narayanaswami et al. | |
| 2009/0192687 A1* | 7/2009 | Zagorski | B60T 7/22 701/70 |
| 2009/0222437 A1* | 9/2009 | Niu | G06F 17/30864 |
| 2009/0287678 A1 | 11/2009 | Brown et al. | |
| 2009/0292687 A1* | 11/2009 | Fan | G06F 17/30654 |
| 2009/0300586 A1 | 12/2009 | Bernardini et al. | |
| 2009/0327809 A1 | 12/2009 | Joy et al. | |
| 2010/0031234 A1 | 2/2010 | Chaar et al. | |
| 2012/0124071 A1* | 5/2012 | Gebhard | G06F 17/3097 707/767 |
| 2012/0164991 A1 | 6/2012 | Zhu et al. | |
| 2012/0296743 A1* | 11/2012 | Velipasaoglu | G06Q 30/0251 705/14.54 |
| 2012/0329031 A1 | 12/2012 | Uchida | |
| 2013/0144605 A1* | 6/2013 | Brager | G06F 17/3061 704/9 |
| 2013/0191680 A1 | 7/2013 | Freund | |
| 2013/0246129 A1 | 9/2013 | Chandrasekaran et al. | |
| 2013/0268519 A1 | 10/2013 | Cucerzan et al. | |
| 2014/0032470 A1 | 1/2014 | McCarthy et al. | |
| 2014/0172880 A1 | 6/2014 | Clark et al. | |
| 2014/0172883 A1 | 6/2014 | Clark et al. | |
| 2014/0195532 A1 | 7/2014 | Dheap et al. | |
| 2014/0214820 A1 | 7/2014 | ODonnell | |
| 2014/0297268 A1* | 10/2014 | Govrin | G06Q 40/02 704/9 |
| 2015/0032724 A1 | 1/2015 | Thirugnanasundaram et al. | |
| 2015/0127598 A1* | 5/2015 | Pinckney | G06N 99/005 706/52 |
| 2015/0356142 A1 | 12/2015 | Proux | |
| 2016/0117485 A1* | 4/2016 | Allen | G06F 19/345 705/2 |
| 2016/0134961 A1* | 5/2016 | Shaffer | H02J 7/00 381/74 |
| 2016/0140216 A1* | 5/2016 | Allen | G06F 17/30657 707/722 |
| 2016/0154892 A1* | 6/2016 | Carrier | G06F 17/30876 707/691 |
| 2016/0171392 A1* | 6/2016 | Allen | G06F 17/30657 706/11 |

OTHER PUBLICATIONS

R. High, "The Era of Cognitive Systems: An Inside Look at IBM Watson and How it Works," IBM Redbooks, 2012, pp. 1-15.
Yuan et al., "Watson and Healthcare," IBM developerWorks, 2011, pp. 1-9.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717, pp. 1-5.
List of IBM Patents or Applications Treated as Related.
Dan Istrate et al., Embedded Implementation of Distress Situation Identification through Sound Analysis, The Journal on Information Technology in Healthcare 6, pp. 204-211, 2008.

* cited by examiner

Figure 4

INFORMATION HANDLING SYSTEM AND COMPUTER PROGRAM PRODUCT FOR DYNAMICALLY ASSIGNING QUESTION PRIORITY BASED ON QUESTION EXTRACTION AND DOMAIN DICTIONARY

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). When a large number of users are simultaneously submitting multiple questions (e.g., thousands of questions at any given time), traditional QA systems treat every question with the same level of priority in terms of prioritization so that the questions are processed in chronological order, but this can lead to inefficient allocation of the QA system resources, such as can occur when single "noisy neighbor" user asks multiple, narrowly focused questions directed to a subset of the ingested corpus, resulting in poor or uneven response processing by the QA system for other questions that might have similar or higher importance. While certain question prioritization schemes have been proposed which use one or more ad-hoc static priority field values associated with the incoming request to perform prioritization, such schemes are not applicable to the processing of natural language questions due to the non-deterministic nature of such questions. As a result, the existing solutions for efficiently prioritizing and processing questions are extremely difficult at a practical level.

SUMMARY

Broadly speaking, selected embodiments of the present disclosure provide a system, method, and apparatus for dynamically prioritizing the processing of inquiries to an information handling system capable of answering questions by using the cognitive power of the information handling system to perform natural language processing (NLP) analysis on each question and identify named entity and question context information which provide feature values used by a question priority manager to assign a target question priority value to each question. In selected embodiments, the information handling system may be embodied as a question answering (QA) system which receives a set of questions from one or more users. For each question, the QA system determines a question topic and associated question urgency value by performing NLP analysis to identify the question topic in terms of named entities, n-grams, phrases, and/or terms in the question, and also comparing them with one or more domain dictionaries (for the domain in which the QA system is operating), and by extracting question context information from the question. In selected embodiments, the extracted question context information includes, but is not limited to, data that identifies the question timing (e.g., date and time), question source (e.g., user ID, source device, channel, etc.), question origination location (e.g., hospital, public-safety answering point, or other special interest location identifier), and the like. The QA system may also determine selected operational metrics data for the processing of each question, including but not limited to available resources, operational or run-time data for the QA system (e.g., CPU utilization, available disk space, bandwidth utilization, etc.), existing processing requirements under Service Level Agreement (SLA) and/or Quality of Service (QoS) commitments, history of analysis and feedback for the question or submitting user, and the like. Using the question topic, question context information, and/or operational metric data to populate feature values of a priority assignment module, the QA system may use an artificial intelligence (AI) learned and rule-based logic to determine and assign a question urgency value to each question for purposes of prioritizing the response processing of each question by the QA system. Using the question topic and feature values to weight the question priority, the resulting question urgency value may be used to dynamically prioritize response processing by the QA system, such as by using question urgency values to sort question processing or including the question urgency value with each question.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 4 illustrates an example output of a question priority manager which processes a data set to generate feature values which are used by a machine-learning predictive model to assign a target question priority value to each question.

DETAILED DESCRIPTION

Figure 1:
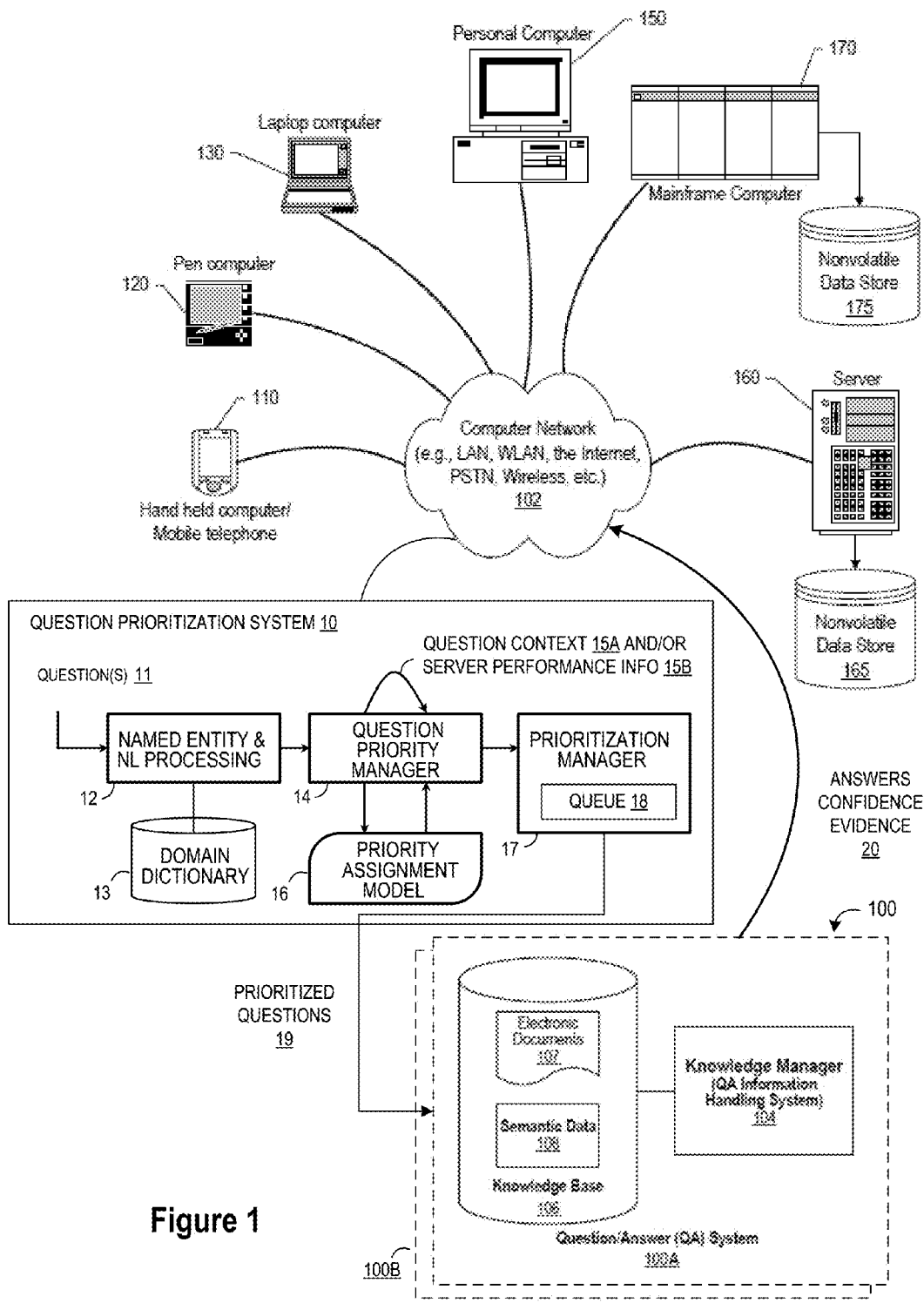
FIG. 1 depicts a network environment that includes a knowledge manager that utilizes a knowledge base.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 102. The QA system 100 includes a knowledge manager 104 that is connected to a knowledge base 106 and configured to provide question/answer (QA) generation functionality for one or more content users who submit across the network 102 to the QA system 100. To assist with efficient sorting and presentation of questions to the QA system 100, the prioritization system 10 may be connected to the computer network 102 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, n-grams, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human—computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) based learned models and in some cases rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130) connected over the network 102 for communication with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 102, a knowledge base or corpus of electronic documents 106 or other data, a content creator 108, content users, and other possible sources of input. In selected embodiments, some or all of the inputs to knowledge manager 104 may be routed through the network 102 and/or the question prioritization system 10. The various computing devices (e.g., 110, 120, 130) on the network 102 may include access points for content creators and content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
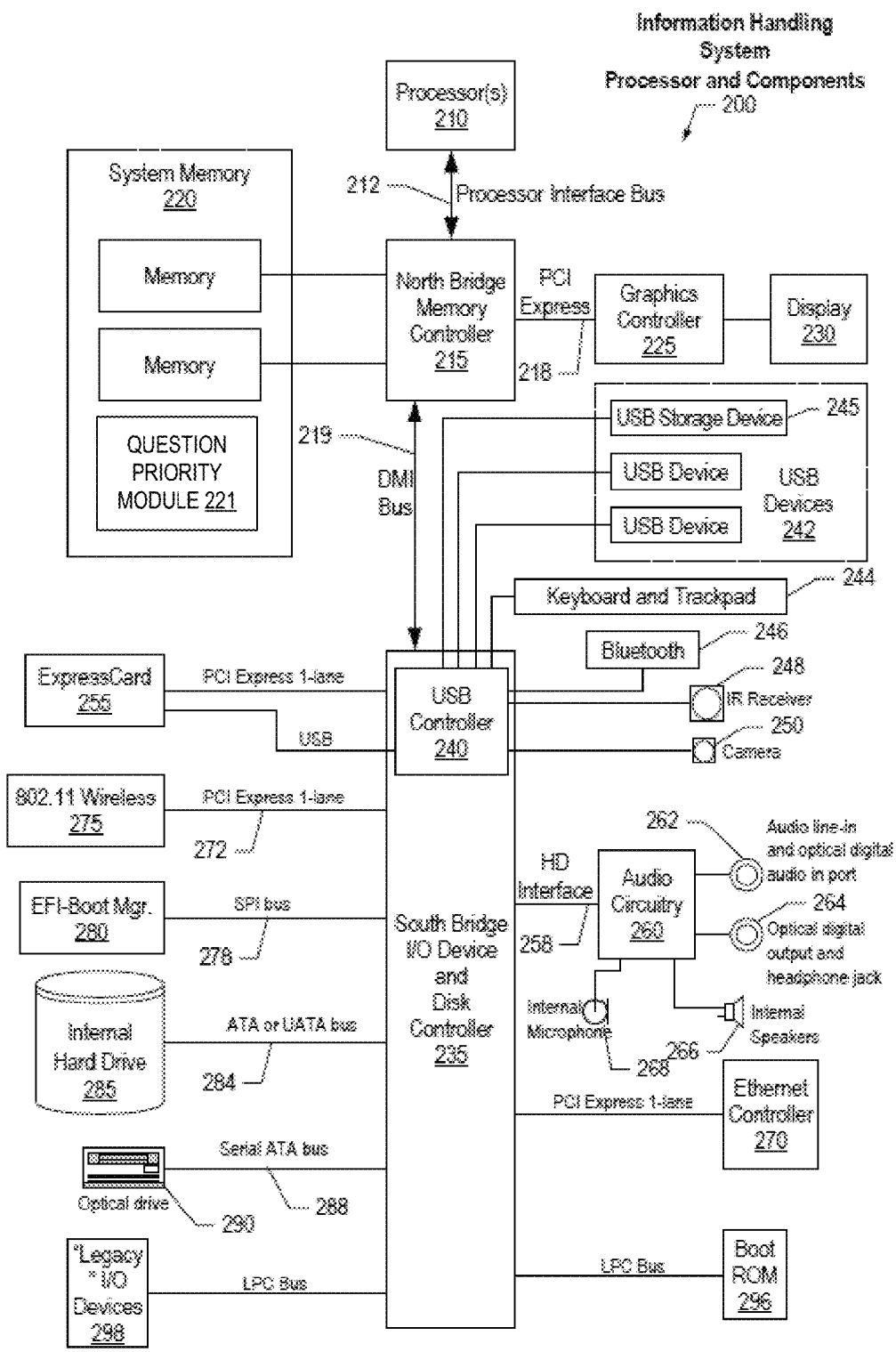
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a question priority module 221 which may be invoked to dynamically assigning question priority based on question extraction and domain dictionary. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
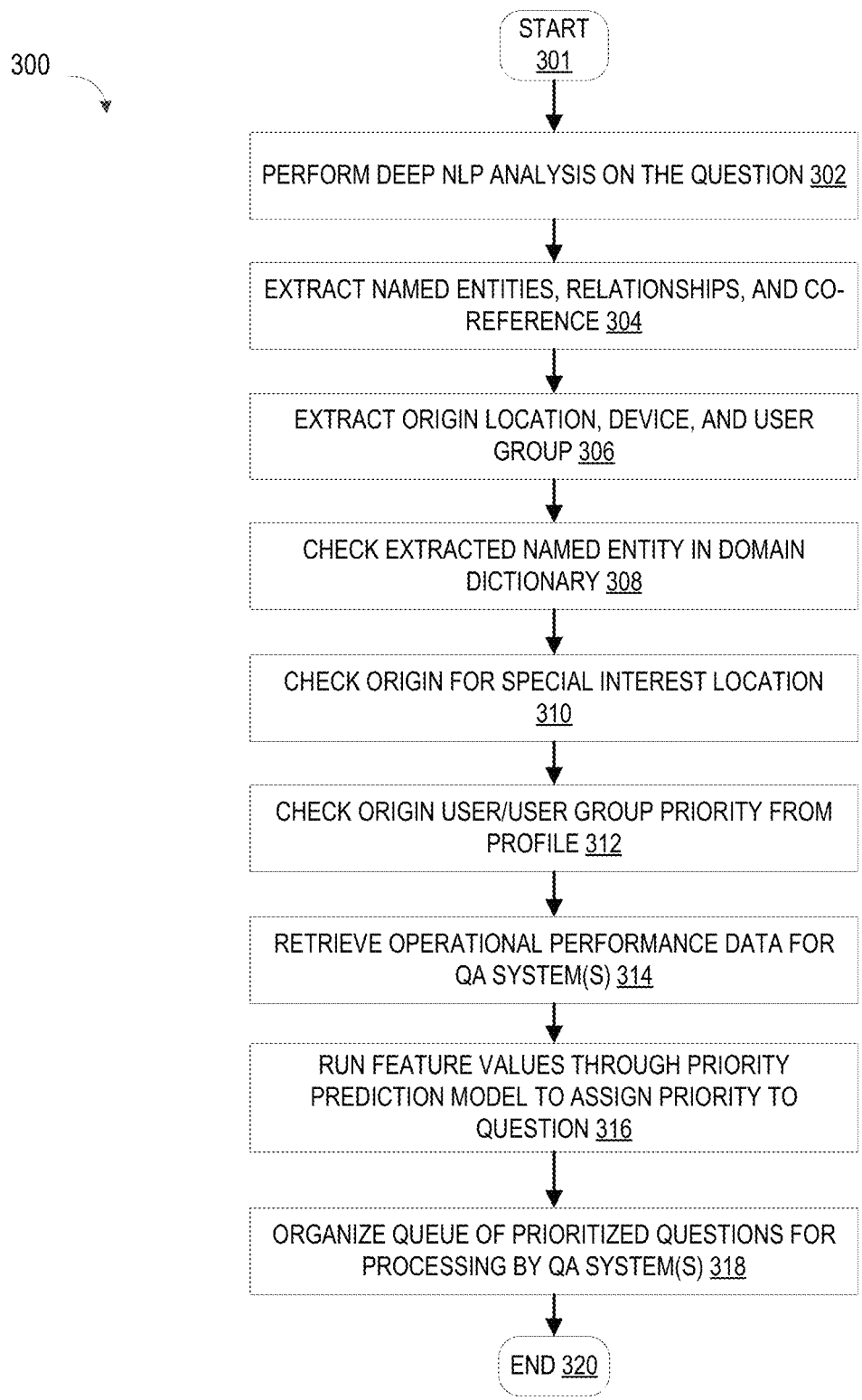
FIG. 3 illustrates a simplified flow chart showing the logic for dynamically assigning question priority based on extracted named entity and question context information.
Figure 4:
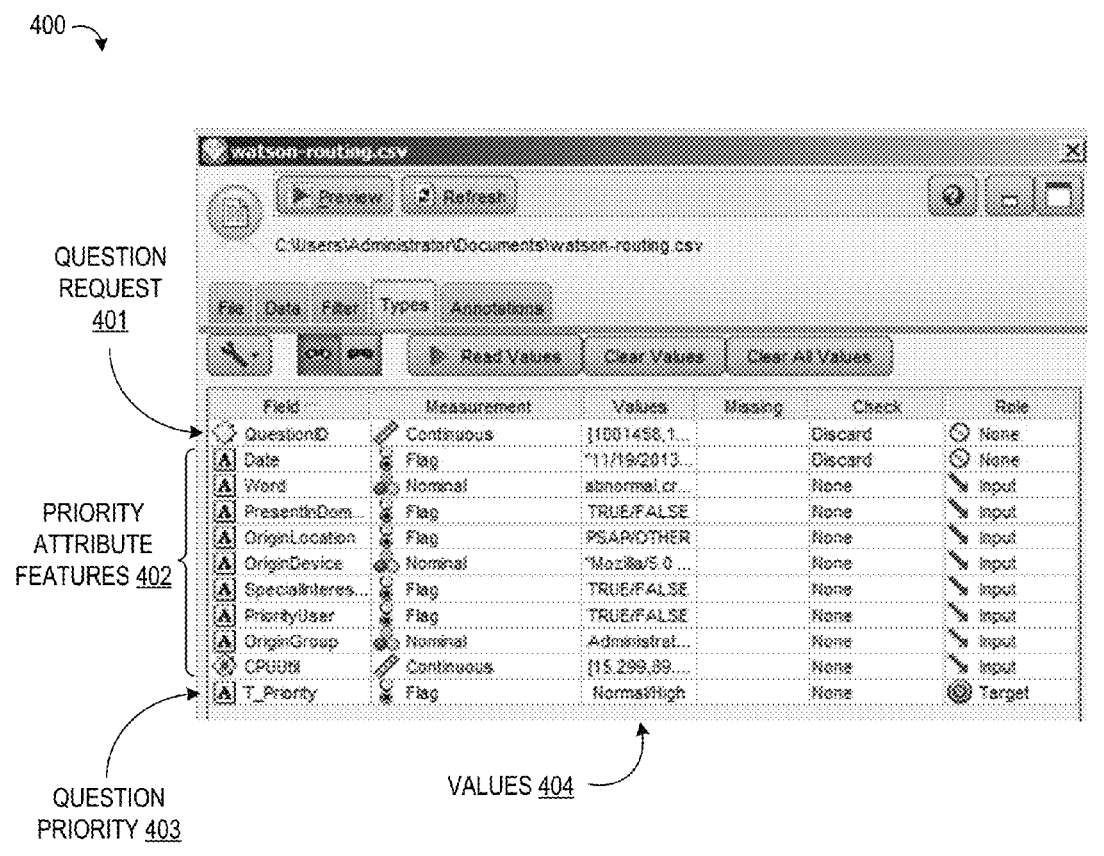

FIGS. 3-4 depict an approach that can be executed on an information handling system to prioritize questions being presented to a knowledge management system, such as QA system 100 shown in FIG. 1. This approach can be included within the QA system 100 or provided as a separate question prioritization system 10 that is interposed between the computer network 102 and the QA system 100. Wherever implemented, the disclosed question prioritization scheme mines submitted questions for information to obtain an improved understanding of the entirety of the question before assessing the question's priority. The mined information includes the presence of any key terms, phrases, or named entities in the question which may be determined by using NLP techniques to extract and compare the question terms with terms stored in one or more domain dictionaries which store significant words, names, or phrases in different industry areas. In addition, the prioritization scheme extracts contextual information for each question, such as the location or device where the question was submitted, the identity or profile of the user submitting the question, and even the system context under which the question was asked, (e.g., operational metric data for the processing of each question) which can affect the prioritization of the question. The prioritization scheme may also leverage key business performance indicators into processing priority, such as SLA or QoS requirements. Those skilled in the art will appreciate the applicability of the question prioritization approach in a deep question answering system where a plurality of different questions might be posed by different users in using varying phrasing. For example, users may submit questions, such as "What is the number to reach the Air Ambulance?" or "Does the local pharmacy provide a first aid kit?" or "What is the current terror threat level?" or "How should I use the defibrillator?" Based on the extracted key terms, question context, and/or system context under which the question are asked, the questions can be prioritized using the techniques and approaches described herein.

To provide additional details for an improved understanding of selected embodiments of the present disclosure, reference is now made to FIG. 3 which depicts a simplified flow chart showing the logic for dynamically assigning question priority based on extracted named entity and question context information. The processing shown in FIG. 3 is performed when a question request (e.g., question 11) is presented for processing, such as by a cognitive system, such as an IBM Watson™ QA system or other natural language question answering system shown in FIG. 1. FIG. 3 processing commences at 301 whereupon, at step 302, the process analyzes the question request using NLP techniques to identify key question attributes and terms that are included in the question request. The processing at step 302 may be performed at the question prioritization system 10, QA system 100, or other NLP question answering system. As described herein, a Natural Language Processing (NLP) routine may be used to perform deep NLP analysis on the question request, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is the number to reach the Air Ambulance?" and return a listing of one or more key terms included in the question request.

At step 304, urgent words or phrases are extracted from the question request. The processing at step 304 may be performed at the Named Entity subsystem 12 (FIG. 1) or other NLP routine which processes or triages the question request to extract urgent words or phrases contained in the question, such as named entity, relationship, and/or co-reference information contained in the question request. For example, in a first question request—"What is the number to reach the Air Ambulance?"—the extracted named entity information may be the term "Air Ambulance," while the extracted relationship information may refer to the relationship between air ambulance (named entity), number (noun) and reach (verb), and the extracted co-reference information may refer to the (phone) number to contact the air ambulance. In contrast, a second question request—"Does the local pharmacy provide a first aid kit?—might include extracted named entity information, "pharmacy," which would merit a lower priority assessment as compared to the extracted "Air Ambulance" term from the first question request. As a result of the extraction processing step 304, one or more priority attribute features for the question request may be identified and quantified, such as a question identification (e.g., QuestionID) or date attribute feature for the question request (e.g., Date=Nov. 19, 2013) or a word attribute feature for the question request (e.g., Word=abnormal or critical or fire or pain or effective, etc.).

At step 306, origin information for the question request is extracted from the question request. The processing at step 304 may be performed at the Named Entity subsystem 12 and/or Question Priority Manager 14 (FIG. 1) or other NLP routine. In selected embodiments, the extracted origin information may be geographical or location information relating to the question request (e.g., a 911 call center, hospital, or other specified location). In addition or in the alternative, the extracted origin information may include geographical or location information for the user device which submitted the question request (e.g., the GPS location information for a cell phone or a communication channel over which the question request was presented, the IP address for an originating device, etc.). In addition or in the alternative, the extracted origin information may include geographical or location information for a user group which submitted the question request (e.g., an identifier for a customer group associated with question request, such as a hospital group having a specified SLA or QoS agreement). As a result of the origin processing step 306, one or more priority attribute features for the question request may be identified and quantified, such as an origin location attribute feature for the question request (e.g., OriginLocation=PSAP or Precinct, or Federal Location or Other) or an origin device attribute feature for the question request (e.g., OriginDevice=Mozilla/5.0 (iPad) or Mozilla/5.0 (iPhone) or Mozilla/5.0 (Android) or Window NT 6.1).

At step 308, the extracted urgent words from the question request may be compared or checked against a domain entity dictionary. By leveraging a domain dictionary (e.g., Domain Dictionary 13), the processing step 308 may can compare extracted urgent words or phrases from the question request with a plurality of different dictionaries for different domains or areas (e.g., travel, healthcare, electronics, game shows, financial services). The results of the processing step 308 may be used to assign a higher priority level to the question request which contains terms that are also stored in the domain entity dictionary. The processing at step 308 may be performed at the Named Entity subsystem 12 and/or Question Priority Manager 14 (FIG. 1) or other NLP routine. As a result of the domain dictionary check processing step 308, one or more priority attribute features for the question request may be identified and quantified to indicate whether extracted words in the question request correspond to terms in a domain dictionary, such as an domain dictionary attribute feature for the question request (e.g., PresentInDomainDict=True or False).

At step 310, the question request may be analyzed to determine if the extracted origin location information corresponds to a special interest location (such as a hospital, public safety answering point, or other specified location) which is slated for higher priority treatment. At processing step 310, the extracted origin location information may be checked against certain specified locations having assigned priority levels which are used to elevate or increase the prioritization of the question request. In addition or in the alternative, the extracted origin location information may be checked against dynamically identified origin locations (e.g., regions where there is a power outage, tornado, or other incident of interest). The results of the processing step 310 may be used to assign a higher priority level to the question request. The processing at step 310 may be performed at the Named Entity subsystem 12 and/or Question Priority Manager 14 (FIG. 1) or other NLP routine. As a result of the special interest location processing step 310, one or more priority attribute features for the question request may be identified and quantified to indicate whether the question request originated from a special interest location (e.g., SpecialInterestLocation=True or False).

At step 312, the question request may be analyzed to assess the priority of the user or user group who originated or submitted the question request. For example, if profile information for the originating user or user group indicates that the user is entitled to higher priority treatment under the processing requirements of Service Level Agreement (SLA) and/or Quality of Service (QoS) commitments, the results of the processing step 312 may be used to elevate or increase the prioritization of the question request. The processing at step 312 may be performed at the Named Entity subsystem 12 and/or Question Priority Manager 14 (FIG. 1) or other NLP routine. As a result of the user priority processing step 312, one or more priority attribute features for the question request may be identified and quantified to indicate the priority of the user or user group that submitted the question request (e.g., OriginGroup=Management or Administrator or Agent or Customer or Unknown).

At step 314, the question request may be analyzed by retrieving operational performance-related data, such as operational run-time data, for the server systems which are available to answer the question request. Examples of such retrieved performance data include, but are not limited to CPU utilization rates, available disk space, bandwidth utilization at the question answering system. If the retrieved operational performance data indicates that a first QA system is overloaded, the results of the processing step 314 will be used to assign the question request to another QA system or instance. The processing at step 314 may be performed at the Named Entity subsystem 12 and/or Question Priority Manager 14 (FIG. 1) or other NLP routine. As a result of the processing step 314, one or more priority attribute features for the question request may be identified and quantified to indicate the operational performance-related data for the applicable QA system (e.g., CPUUtil=15.299% or 89.55%).

At step 316, the process uses the combined results of the previous steps 302-314 to run feature values through a priority prediction machine learning model to generate a priority value for the question request. In selected embodiments, the processing at step 316 may be performed at Question Priority Manager 14 (FIG. 1) or other NLP routine which invokes the Priority Assignment Model 16 for each question request using associated feature values extracted from the question request and other places. In response to the populated feature values, the priority prediction model generates a target variable (e.g., T_Priority=Escalated or Low or Normal or High) for the question request which may be assigned as a target priority value to the question request. To illustrate an example result of the processing step 316, reference is now made to FIG. 4 which depicts an example screen shot output 400 from the question priority manager which processes a data set for a specified question request 401 to generate values 404 for a plurality of priority attribute features 402 and a corresponding target question priority 403. As illustrated, the question request 401 is identified with a QuestionID field having a specified value. In addition, an associated plurality of values 404 for the priority attribute fields 402 may be generated by the question priority manager which extracts, reads, and populates different feature or attribute fields 402 (e.g., Date, Word, PresentInDomainDictionary, OriginLocation, OriginDevice, PriorityUser, OriginGroup, SpecialInterestLocationIndicator, CPUUtil, etc.) with corresponding priority attribute feature values 404. In selected embodiments, the question priority manager may use a machine-learning predictive model to assign a target question priority value 404 (e.g., "Normal" or "High") as the question priority 403 for the question request based on the question topic, question context information, and/or operational performance metric data for the QA system. For example, the question priority may be based on specified named entity or term phrases extracted from the question and present in a domain entity dictionary, the originating user group name/id, the originating location, the operational run-time data for the system, and overall SLA commitments on processing time. In evaluating the priority attribute values, numerical thresholds or categories may be used to assign priority values using machine learning classification techniques, such as linear regression, logistic regression, decision trees, and the like. For example, lower priority may be indicated if the number of question requests is at or below a specified threshold, while higher priority may be indicated if the number of question requests is above the specified threshold. Similarly, lower priority may be indicated if the retrieved system performance metric (e.g., CPUUtil) is at or below a specified performance threshold, while higher priority may be indicated if the retrieved system performance metric is above the specified performance threshold. In addition, higher priority may be indicated if the originating user group is identified as a priority group (e.g., OriginGroup=Administrator or Agent or Management), while lower priority may be indicated if the originating user group is part of a lower priority group (e.g., OriginGroup=Customer or Unknown).

Referring back to FIG. 3, the question request is organized in the question queue based on its assigned priority for delivery to the QA system at step 318. In selected embodiments, the processing at step 318 may be performed at Prioritization Manager 17 (FIG. 1) or other message processing software (e.g., IBM's WebSphere MQ or MQ Series software) which places the question request on a heap for processing by a designated QA system. The Prioritization Manager 17 may organize the question queue by weighing the assigned priority values for the question requests such that high priority questions having high-ranking priority values are put to the front of the queue for sequential removal by a designated QA system pipeline. After prioritization of pending question requests, prioritization process ends at step 320, at which point the question requests in the question queue may be processed by the designated pipeline (e.g., QA System 100A in the QA system cluster 100) which de-queues the highest priority question request. In selected embodiments, each de-queued question request may include the assigned priority value. However, in other embodiments, the question requests in the question queue do not include the assigned priority values.

By now, it will be appreciated that there is disclosed herein a system, method, apparatus, and computer program product for dynamically prioritizing questions based on extracted question parameters using an information handling system having a processor and a memory. As disclosed, the system, method, apparatus, and computer program product receive a plurality of questions and extract therefrom a plurality of question priority parameters including one or more question topics and a plurality of question context parameters for each question. In selected embodiments, the question priority parameters may be extracted by performing a natural language processing (NLP) analysis of each question, wherein the NLP analysis results in one or more question topics comprising extracted named entity information from said question. In other embodiments, the question priority parameters may be extracted by comparing the extracted named entity information from each question to key priority terms contained in one or more domain dictionary databases to identify extracted named entity information that matches one or more key priority terms. In other embodiments, the question priority parameters may be extracted by identifying, for each question, question timing data, question source data, question location data, profile data for the user or user group submitting the question and performance requirement data for the user or user group submitting the question. Based on the plurality of question priority parameters identified for said question, a target priority value is determined for each question. In selected embodiments, the target priority value may be determined by executing a priority prediction machine learning model against the plurality of question priority parameters identified for each question to generate a priority value for said question. In addition, one or more system performance parameters—such as a processor utilization data, available memory space data, and bandwidth utilization data—may be identified by the information handling system for use in determining the target priority value for each question. After generating the target priority values, the information handling system may dynamically prioritize processing of the plurality of questions by comparing the target priority values for each of the plurality of questions. In selected embodiments, processing of the plurality of questions may be dynamically prioritized by applying an artificial intelligence (AI) learned models and rule-based logic at the information handling system to sort the plurality of questions based on the target priority values for the plurality of questions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
one or more processors;
a memory coupled to at least one of the processors;
a set of instructions stored in the memory and executed by at least one of the processors to dynamically prioritize questions for response processing based on extracted question parameters, wherein the set of instructions perform actions of:
receiving, by the information handling system, a plurality of questions;
extracting, by the information handling system, a plurality of question priority parameters comprising one or more question topics and a plurality of question context parameters for each question;
identifying, by the information handling system, system performance parameters for the information handling system comprising processor utilization data, available memory space data, and bandwidth utilization data;
determining, by the information handling system, a target priority value for each question based on the system performance parameters and the plurality of question priority parameters identified for said question;
dynamically prioritizing, by the information handling system, response processing of the plurality of questions by comparing the target priority values for each of the plurality of questions to generate a prioritized plurality of questions;
storing the prioritized plurality of questions in a question queue at the information handling system which is configured to support asynchronous delivery of the prioritized plurality of questions; and
passing the prioritized plurality of questions as messages between to one or more question answering systems.

2. The information handling system of claim 1, wherein extracting the plurality of question priority parameters comprises performing, by the information handling system, a natural language processing (NLP) analysis of each question, wherein the NLP analysis results in one or more question topics comprising extracted named entity information from said question.

3. The information handling system of claim 2, wherein extracting the plurality of question priority parameters further comprises comparing the extracted named entity information from each question to key priority terms contained in one or more domain dictionary databases to identify extracted named entity information that matches one or more key priority terms.

4. The information handling system of claim 1, wherein extracting the plurality of question priority parameters comprises identifying, by the information handling system, for each question, question timing data, question source data, question location data, profile data for the user or user group submitting the question, and performance requirement data for the user or user group submitting the question.

5. The information handling system of claim 1, wherein determining a target priority value for each question comprises executing, by the information handling system, a priority prediction machine learning model against the plurality of question priority parameters identified for each question to generate a priority value for said question.

6. The information handling system of claim 1, wherein the actions further comprise quantifying, by the information handling system, one or more priority attribute features for each question based on the system performance parameters to indicate operational performance-related data for the information handling system.

7. The information handling system of claim 1, wherein dynamically prioritizing response processing of the plurality of questions comprises applying an artificial intelligence (AI) learned models and rule-based logic at the information handling system to sort the plurality of questions based on the target priority values for the plurality of questions and to present the plurality of questions in sorted order to a question answering (QA) system for response processing.

8. A computer program product stored in a non-transitory computer readable storage medium, comprising computer instructions that, when executed by an information handling system, causes the information handling system to dynamically prioritize questions for response processing based on extracted question parameters by performing actions comprising:

receiving, by the information handling system, a plurality of questions;

extracting, by the information handling system, a plurality of question priority parameters comprising one or more question topics and a plurality of question context parameters for each question;

identifying, by the information handling system, system performance parameters for the information handling system comprising processor utilization data, available memory space data, and bandwidth utilization data;

determining, by the information handling system, a target priority value for each question based on the plurality of question priority parameters identified for said question;

dynamically prioritizing, by the information handling system, response processing of the plurality of questions by comparing the target priority values for each of the plurality of questions to generate a prioritized plurality of questions;

storing the prioritized plurality of questions in a question queue at the information handling system which is configured to support asynchronous delivery of the prioritized plurality of questions; and passing the prioritized plurality of questions as messages between to one or more question answering systems.

9. The computer program product of claim 8, wherein extracting the plurality of question priority parameters comprises performing, by the information handling system, a natural language processing (NLP) analysis of each question, wherein the NLP analysis results in one or more question topics comprising extracted named entity information from said question.

10. The computer program product of claim 9, wherein extracting the plurality of question priority parameters further comprises comparing the extracted named entity information from each question to key priority terms contained in one or more domain dictionary databases to identify extracted named entity information that matches one or more key priority terms.

11. The computer program product of claim 8, wherein extracting the plurality of question priority parameters comprises identifying, by the information handling system, for each question, question timing data, question source data, question location data, profile data for the user or user group submitting the question, and performance requirement data for the user or user group submitting the question.

12. The computer program product of claim 8, wherein determining a target priority value for each question comprises executing, by the information handling system, a priority prediction machine learning model against the plurality of question priority parameters identified for each question to generate a priority value for said question.

13. The computer program product of claim 8, further comprising quantifying, by the information handling system, one or more priority attribute features for each question based on the system performance parameters to indicate operational performance-related data for the information handling system.

14. The computer program product of claim 8, wherein dynamically prioritizing response processing of the plurality of questions comprises sorting the plurality of questions based on the target priority values for the plurality of questions and presenting the plurality of questions in sorted order to a question answering (QA) system for response processing.

* * * * *